United States Patent [19]
Yokomichi et al.

[11] Patent Number: 5,064,983
[45] Date of Patent: Nov. 12, 1991

[54] WIRE CUTTING ELECTRIC DISCHARGE MACHINE

[75] Inventors: Shigeharu Yokomichi, Atsugi; Yasunori Ono, Hadano, both of Japan

[73] Assignee: Amada Wasino Co., Ltd., Japan

[21] Appl. No.: 540,755

[22] Filed: Jun. 20, 1990

[30] Foreign Application Priority Data

Jun. 24, 1989 [JP] Japan .................. 1-74296

[51] Int. Cl.$^5$ ............................. B23H 7/10
[52] U.S. Cl. ................. 219/69.12; 219/69.14
[58] Field of Search ............ 219/69.14, 69.12; 204/206, 224 M

[56] References Cited

U.S. PATENT DOCUMENTS

| | | | |
|---|---|---|---|
| 3,928,163 | 12/1975 | Ullman et al. ............ | 204/206 |
| B13,928,163 | 11/1985 | Ullman et al. ............ | 204/206 |

FOREIGN PATENT DOCUMENTS

| | | | |
|---|---|---|---|
| 211831 | 12/1983 | Japan .................. | 219/69.14 |
| 166426 | 9/1984 | Japan .................. | 219/69.14 |
| 526365 | 2/1971 | Switzerland . | |
| 299326 | 11/1969 | U.S.S.R. . | |
| 2103138 | 2/1983 | United Kingdom . | |
| 84/04066 | 10/1984 | World Int. Prop. O. ....... | 219/69.14 |

Primary Examiner—Geoffrey S. Evans
Attorney, Agent, or Firm—Wigman & Cohen

[57] ABSTRACT

An electric discharge wire cutting machine with one nozzle above the workpiece and another nozzle beneath the workpiece, one of the nozzles having a shape obtained by rotating an arc of a circle about the central axis of the conical configuration of the nozzle. This shape allows the working fluid to be smoothly expelled and to prevent the formation of gas bubbles by the wire in the working zone which might prevent adequate cooling of the wire and thereby cuase the wire to break.

5 Claims, 2 Drawing Sheets

WIRE CUTTING ELECTRIC DISCHARGE MACHINE

BACKGROUND OF THE INVENTION

1. Field of the Invention

The present invention relates to a wire cutting electric discharge machine, and, in particular, to a wire cutting electric discharge machine of the type wherein the electric discharge machining is performed with the workpiece immersed in a process liquid.

2. Description of the Prior Art

As is commonly known, a conventional wire cutting electric discharge machine is provided with an upper and a lower wire guide devices respectively supported on the free ends of the upper arm and the lower arm, which are separated in the vertical direction. Each of the wire guide devices comprises a guide section which guides a wire electrode in the axial direction and an electrical section which supplies electricity to the wire electrode.

Each of the wire guide devices further comprises a nozzle for feeding a process liquid into a processing gap between a workpiece and the wire electrode.

Conventionally, the nozzle is formed with a circular nozzle opening with straight sides at a uniform diameter so that no vibration is imparted to the wire electrode from the turbulent flow of the process liquid when the process liquid is being supplied from the nozzle (for example, as disclosed in Japanese Laid Open Publication No. 57-227691). This nozzle may work well when the process liquid is fed from the nozzle at a comparatively low pressure (several kg/cm$^2$).

In recent years, however, the process liquid is fed at high pressure (several tens of kg/cm$^2$). Under such high pressure, the turbulent flow easily occurs even with the nozzle of the prior art. This is because there are discontinuous points on the open end of the nozzle.

In particular, in the prior art, since the cross-sectional shape and the cross-sectional area close to the open end of the nozzle are uniform, considerable turbulent flow occurs, mainly at the discontinuous points, giving rise to an irregular feeding operation.

This presents a problem from the aspect of improving processing precision.

SUMMARY OF THE INVENTION

An object of the present invention is to provide, with due consideration to the drawbacks of such conventional devices, a wire cutting electric discharge machine wherein the process liquid is fed into the processing gap between the workpiece and the wire electrode with laminar flow so that the precision of the discharge operation is improved.

This object is achieved in the present invention by the provision of a wire cutting electric discharge machine wherein the cross sectional shape of nozzle opening of a nozzle which feeds process liquid into a processing gap between a workpiece and a wire electrode is formed in a shape generated by an arc of a circle rotating around a centerline of the nozzle opening to produce a curved surface which gradually recedes from the centerline toward the free end thereof.

As a result of the above configuration, when the process liquid is fed from the nozzle into the processing gap between the workpiece and the wire electrode the development of turbulent flow in the process liquid at the nozzle opening can be restrained because there are no remarkable discontinuous points from the aspect of hydraulic mechanics, and vibration in the wire electrode can be minimized so that processing precision is improved.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

A wire cutting electric discharge machine is commonly known, therefore, a general explanation only will be given of the overall configuration.

Figure 3:
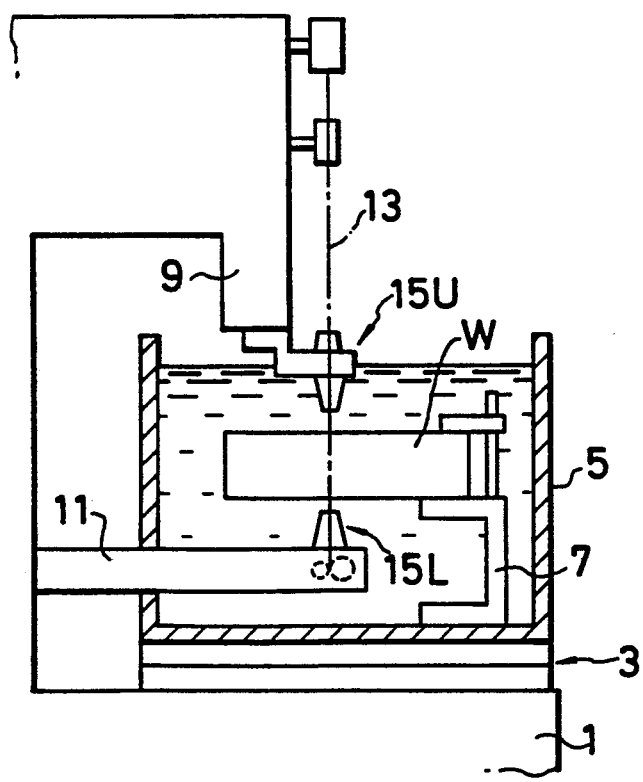
FIG. 3 is a general explanatory drawing showing the overall structure of a wire cutting electric discharge machine.

Now referring to FIG. 3, a process liquid tank 5 is provided on the X, Y table 3 on a main frame 1, the table being freely movable in the X-axis and Y-axis directions. A workpiece W is supported in the process liquid tank 5 by a workpiece support member 7. An upper arm 9 and a lower arm 11 are supported on the main frame 1, positioned above and below the workpiece W respectively. An upper and a lower wire guide device 15U, 15L are respectively provided at the ends of the upper and the lower arms 9, 11. Each of the upper and the lower wire guide devices 15U, 15L comprises a guide section which guides a wire electrode 13 axially, a power section which passes an electric current through the wire electrode 13, and a nozzle through which a process liquid is fed into the space between the wire electrode 13 and the workpiece W.

Figure 1:
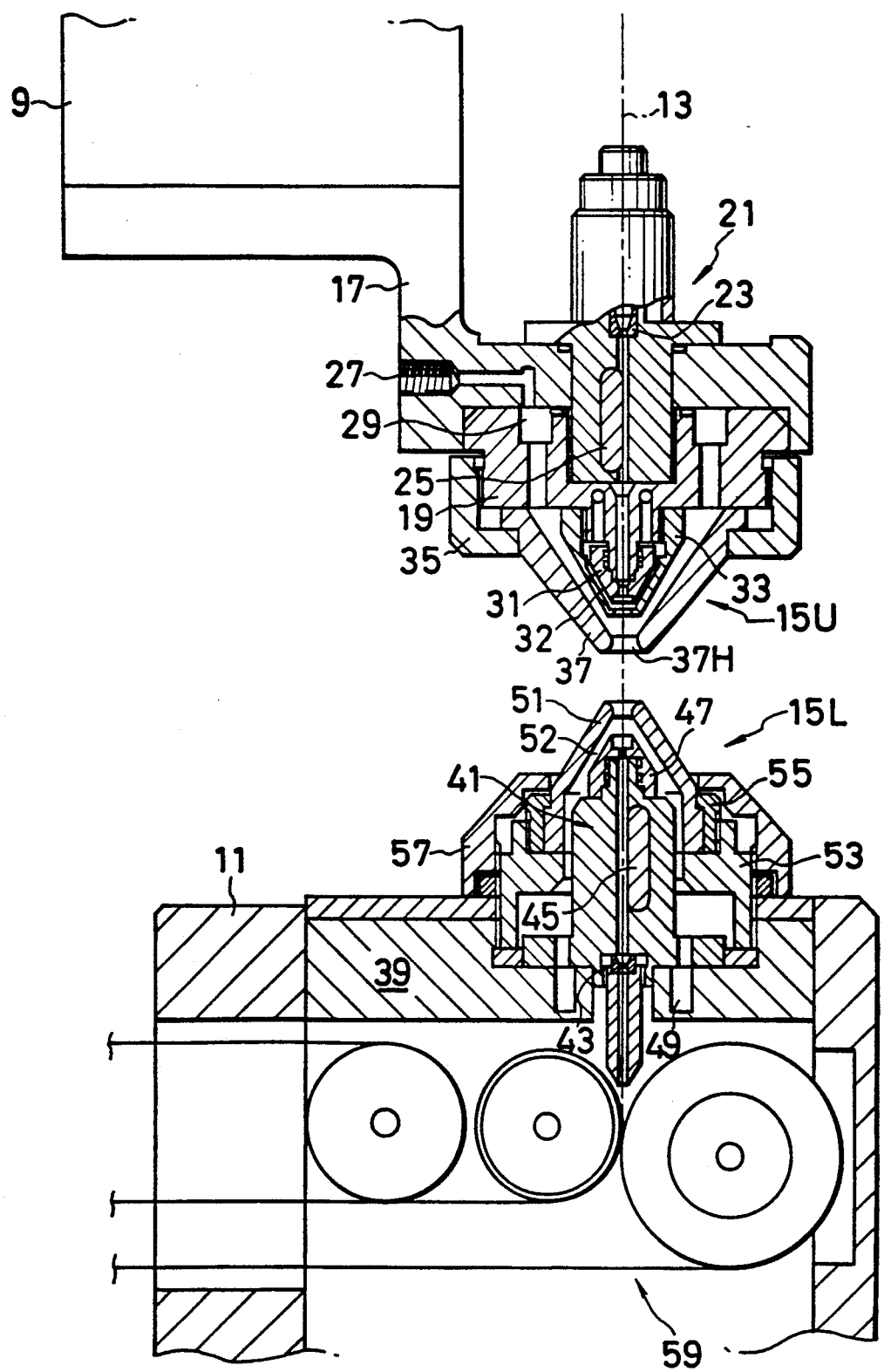
FIG. 1 is a cross-sectional drawing of the main parts of a embodiment of the present invention.

Now referring to FIG. 1, the upper guide device 15U is mounted on the upper arm 9 through a bracket 17. More specifically, a circular support block 19 is secured to the lower surface of the bracket 17 by a bolt or the like, and a guide unit 21 which penetrates the bracket 17 extending upward is secured by a bolt or the like in a freely removable manner to the center section of the support block 19. A small diameter orifice guide 23 formed with a small hole, as one part of the guide section which axially guides the wire electrode 13, is provided in the guide unit 21. An electric terminal 25 is also provided which comes in contact, and passes an electric current through the wire electrode 13.

The support block 19 is formed with a ring-shaped channel 29 connected to a process liquid introduction port 27, and a jet port (now shown) communicating with the ring-shaped channel 29. The jet port also communicates with a conical process liquid channel 32 positioned between a conical wire guide tube 31 surrounding the wire electrode 13 on the lower surface of the support block 19 and a conical jet nozzle 33. Accordingly, the process liquid from the jet port flows along the wire electrode 13 from a space between the wire guide tube 31 and the jet nozzle 33. At this point the process liquid is throttled at the discharge port of the jet nozzle 33 and is therefore ejected at high velocity. The jet of the process liquid is used for passing the wire electrode through a perforation formed in the workpiece and a wire path of the lower guide device 15L.

A conical nozzle 37 is also installed on the lower surface of the support block 19 through a cap nut 35. The nozzle 37 is fabricated in a taper from an insulating material such as a resin, and is formed to cover the lower surface of the jet nozzle 33 and the support block 19. The nozzle 37 is formed with a nozzle opening 37H surrounding the wire electrode 13. The nozzle opening 37H is provided concentrically with the outlet port of the jet nozzle 33 and the wire electrode 13. Accordingly, during processing the process liquid from the process liquid introduction part 27 is fed into the space between the wire electrode 13 and the workpiece through a conical channel positioned between the conical jet nozzle 33 and the conical nozzle 37.

Figure 2:
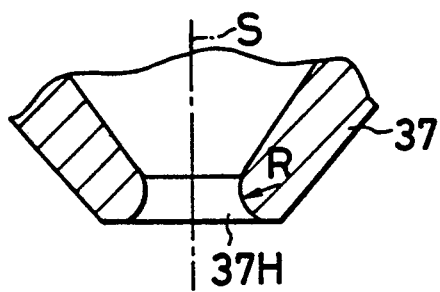
FIG. 2 is an enlarged cross-sectional drawing of the main parts of the embodiment.

In order to suppress turbulent flow at the open end of the nozzle opening 37H, the cross-sectional shape of the nozzle opening 37H, as shown in FIG. 2, is formed in a shape generated by an arc of a circle rotating around a centerline S of the nozzle opening 37H; the shape is defined by a curved surface which gradually recedes from the centerline S toward the free end thereof. In this embodiment of the present invention, the vertical end section is formed as a curved surface of a precise arc with a radius R and gradually expands downward in FIG. 2, and is formed in a manner which eliminates discontinuous points.

In this embodiment of the present invention, in addition to the process liquid flow being stabilized, because of the discontinuous points eliminated, vibration of the wire electrode is restrained. This is because, in this embodiment, since the surface of the nozzle opening gradually recedes from the center line thereof toward the free end of the nozzle, the process liquid jetted from the nozzle out flows at an angle with respect to the wire electrode, while surrounding the wire electrode. Thus, the component forces from the process liquid to the wire electrode in the direction at right angle with respect to the electrode cancel each other, and the component forces in the direction parallel to the wire electrode surround the wire electrode so that the vibration of the electrode is restrained. Further, since the radius of the jet spreads out toward the end of the flow, the turbulent flow is suppressed and the vibration of the wire electrode is restrained.

In other words, in the case where the process liquid is caused to flow in the direction parallel to the wire electrode as the above-mentioned prior art, no component force will act on the wire electrode in the direction at right angle to the wire electrode, and thereby no restraint for a lateral vibration in the wire electrode is imposed. In contrast to this, in this embodiment, the lateral component force from the process liquid restrains the possible lateral vibration of the wire electrode.

The lower wire guide device 15L is formed in the same manner as the upper wire guide device 15U, therefore further explanation will be omitted. A guide unit 41 is installed on a bracket 39 provided on the lower arm 11. A small diameter orifice guide 43 is provided on the guide unit 14 as one part of the guide section for the wire electrode 13, and a conical wire guide tip 47 is provided on the upper end of this guide section. An electric terminal 45 which comes in contact and passes an electric current through the wire electrode 13 is provided in the center section of the guide unit 41.

A ring-shaped channel 49 for supplying process liquid is provided on the bracket 39, and is in communication with a process liquid supply port (omitted from the drawings). A tubular nozzle support member 53 which supports a conical nozzle 51 is provided, surrounding the guide unit 41. The nozzle 51 is fabricated from an insulating body and is mounted on the upper part of the nozzle support member 53 through a cap nut 55.

A conical process liquid channel 52 is formed between the nozzle 51 and the guide tip 47. In addition, a safety cover member 57 fabricated from an insulating body is installed at the periphery of the nozzle support member 53. A wire electrode withdrawal device 59 which feeds out the wire electrode 13 from the system is provided inside the lower arm 11.

In the above configuration, an electric discharge process is performed as follows: with the wire electrode 13 inserted through the upper wire guide device 15U and the lower wire guide device 15L, the process liquid filled into the process liquid tank 5, and the workpiece W immersed in the process liquid, the process liquid is first fed from the upper and lower nozzles 37, 51 into the processing space; then a current is passed through the wire electrode 13 so that an electric discharge is produced between the wire electrode 13 and the workpiece W.

When such an electric discharge process is performed, if the discharge process continues for a long time and the conductivity of the process liquid changes, there would occasionally be a tendency for a discharge to be produced between the wire guide tips 31, 47 close to the workpiece W and the workpiece W, because the upper and lower wire guide devices 15U, 15L are submerged in the process liquid, and the electric terminal 25, 45 and the wire guide tips 31, 47 are respectively electrically connected with each other.

However, because the upper and lower wire guide tips 31, 47 are surrounded by the insulated nozzles 37, 51, the production of a discharge between the wire guide tips 31, 47 and the workpiece W immersed in the process liquid is prevented.

In particular, even when the electric discharge process continues for a long time and the conductivity of the process liquid changes, the production of a discharge between the wire guide tips and the workpiece immersed in the process liquid is prevented, and the discharge between the wire electrode 13 and the workpiece is maintained.

In addition, because the cross-sectional shape of the nozzle opening of the nozzles 37, 51 is formed as a curved surface so that the sides of the tip section gradually expand toward the free end thereof, there are no discontinuous points, and turbulent flow from the open tip is suppressed in the process liquid which is fed from the upper and lower wire guide devices 15U, 15L into the space between the wire electrode 13 and the workpiece W. Accordingly, vibration of the wire electrode is reduced, and processing precision is improved even when the process liquid is fed at a high pressure.

Furthermore, even in the method where the workpiece W is immersed in the process liquid, no accumulation of the processing liquid occurs in the processing space because the process liquid is fed at a high pressure. Therefore, this space can be kept clean and a high quality discharge process can be performed.

As can be understood from the foregoing explanation of this embodiment, in the present invention, since the cross-sectional shape of the nozzle opening of the nozzles is formed as a curved surface with the sides of the tip section gradually expanding toward the free end thereof, turbulent flow of the process liquid from the open tip is suppressed, vibration of the wire electrode is restrained, and processing precision can be improved even when the process liquid is fed at a high pressure. In addition, because the process liquid is supplied at a high pressure to the process space between the wire electrode and the workpiece, the process liquid penetrates deeply into the process space, making it possible to keep the space clean. Therefore, a high quality discharge process is performed.

The wire cutting electric discharge machine of the present invention is not limited to the embodiment herein described. Various modifications will become evident to those skilled in the art after receiving the teachings of the present disclosure, without departing from the scope thereof.

What is claimed is:

1. An electrical discharge cutting machine for cutting a workpiece having upper and lower guide devices between which a wire electrode is to be stretched, in which each of the upper and lower guide devices comprises:

a nozzle for discharging process liquid into a processing gap between a workpiece and the wire electrode, the nozzle being formed into a substantially conical configuration having a tip portion with a substantially horizontal end surface, the nozzle having a tapered inner surface tapered toward the tip portion thereof along which the process liquid flows; and a nozzle opening, through which the wire electrode passes and through which the processing liquid is discharged, formed at the tip portion of the nozzle, the nozzle opening being defined between the inner surface and the end surface of the tip portion of the nozzle so as to extend along a central axis of the conical configuration, wherein the nozzle opening has a shape obtained by rotating an arc of a circle about the central axis of the conical configuration of the nozzle.

2. An electrical discharge cutting machine as claimed in claim 1, wherein the arc of the circle is tangent to the inner surface of the nozzle and to the end surface of the tip portion of the nozzle.

3. An electrical discharge cutting machine as claimed in claim 2, wherein the nozzle opening has an inner side which is associated with the inner surface of the nozzle and an outer side which is associated with the end surface of the tip portion of the nozzle, and a middle portion between the inner and outer sides, wherein the diameter of the nozzle opening at the inner side is smaller than that of the nozzle portion at the outer side, and wherein the diameter of the nozzle portion diminishes gradually from the inner side to the middle portion and increases gradually from the middle portion to the outer side thereof.

4. An electrical discharge cutting machine as claimed in claim 3, wherein the tip portion of the nozzle has a curved inner surface which defines the nozzle opening, and the curved inner surface is formed in a manner which eliminates discontinuous points.

5. An electrical discharge cutting machine as claimed in claim 1, wherein each wire guide device further includes a wire guide tube having a substantially conical configuration, and a fluid passage of the process fluid is defined between the wire guide tube and the inner surface of the nozzle.

* * * * *